United States Patent
Mosleh et al.

(10) Patent No.: US 9,840,679 B2
(45) Date of Patent: Dec. 12, 2017

(54) GELLING NANOFLUIDS FOR DISPERSION STABILITY

(71) Applicant: Howard University, Washington, DC (US)

(72) Inventors: Mohsen Mosleh, Bethesda, MD (US); Mohammad Ghaderi-Yeganeh, Rockville, MD (US)

(73) Assignee: Howard University, Washington, DC (US)

( * ) Notice: Subject to any disclaimer, the term of this patent is extended or adjusted under 35 U.S.C. 154(b) by 0 days.

(21) Appl. No.: 14/774,619

(22) PCT Filed: Mar. 14, 2014

(86) PCT No.: PCT/US2014/027832
§ 371 (c)(1),
(2) Date: Sep. 10, 2015

(87) PCT Pub. No.: WO2014/160525
PCT Pub. Date: Oct. 2, 2014

(65) Prior Publication Data
US 2016/0017253 A1    Jan. 21, 2016

Related U.S. Application Data

(60) Provisional application No. 61/784,636, filed on Mar. 14, 2013.

(51) Int. Cl.
*C10M 141/02* (2006.01)
*C09C 1/44* (2006.01)
(Continued)

(52) U.S. Cl.
CPC ............ *C10M 141/02* (2013.01); *C09C 1/44* (2013.01); *C09C 3/08* (2013.01); *C10M 141/12* (2013.01);
(Continued)

(58) Field of Classification Search
CPC .................. C10N 2220/082; C10N 2220/084
(Continued)

(56) References Cited

U.S. PATENT DOCUMENTS 3,285,341 A    11/1966 Parker
6,326,338 B1    12/2001 Garrett
(Continued)

FOREIGN PATENT DOCUMENTS

EP    1 845 073 A1    10/2007
EP    2 316 912 A1    5/2011
(Continued)

OTHER PUBLICATIONS

Stephen U.S. Choi and Jeffrey A. Eastman, "Enhancing Thermal Conductivity of Fluids with Nanoparticles," in Developments and Applications of Non-Newtonian Flows, D. A. Singer and H. P. Wang, Eds., ASME International Mechanical Engineering Congress & Exposition, Nov. 12-17, 1995, San Francisco, California, 8 pages.
(Continued)

*Primary Examiner* — Ellen McAvoy
(74) *Attorney, Agent, or Firm* — Fitch, Even, Tabin & Flannery, LLP (57) ABSTRACT

A gelling nanofluid and methods for manufacture are provided. The composition and methods for manufacture produce nanofluid gels so that the settlement of nanoparticles in a base fluid is improved due to the inhibition of particle movement in the gel. The nanofluid gel is produced by using a gelling agent which is either coated on the nanoparticles prior to dispersion in the base fluid or directly introduced in the base fluid.

22 Claims, 4 Drawing Sheets

(51) Int. Cl.
*C09C 3/08* (2006.01)
*C10M 141/12* (2006.01)
*C10M 173/00* (2006.01)
*C10M 177/00* (2006.01)

(52) U.S. Cl.
CPC ........ *C10M 173/00* (2013.01); *C10M 177/00* (2013.01); *C01P 2004/64* (2013.01); *C10M 2201/041* (2013.01); *C10M 2201/065* (2013.01); *C10M 2201/066* (2013.01); *C10M 2207/0215* (2013.01); *C10M 2207/126* (2013.01); *C10M 2209/12* (2013.01); *C10N 2220/082* (2013.01); *C10N 2230/24* (2013.01); *C10N 2250/10* (2013.01)

(58) Field of Classification Search
USPC .......................................................... 508/167
See application file for complete search history.

(56) References Cited

U.S. PATENT DOCUMENTS

| | | | | |
|---|---|---|---|---|
| 6,960,556 | B2* | 11/2005 | Gingerich | C01G 41/00 423/561.1 |
| 7,825,073 | B2 | 11/2010 | Welton et al. | |
| 8,258,086 | B2* | 9/2012 | Patel | B82Y 30/00 508/113 |
| 8,476,206 | B1* | 7/2013 | Malshe | C10M 141/00 508/165 |
| 8,492,319 | B2* | 7/2013 | Malshe | C10M 171/06 508/154 |
| 8,507,414 | B2* | 8/2013 | Takahama | C10M 173/02 508/113 |
| 8,703,665 | B2* | 4/2014 | Branson | B82Y 30/00 252/74 |
| 9,222,050 | B1* | 12/2015 | Simonetti | C10M 125/26 |
| 9,434,905 | B2* | 9/2016 | Mosleh | C10M 171/00 |
| 2010/0029518 | A1* | 2/2010 | Markovitz | C10M 125/02 508/113 |
| 2014/0162915 | A1* | 6/2014 | Hatfield | C10M 125/22 508/167 |
| 2014/0371118 | A1* | 12/2014 | Mosleh | C10M 171/06 508/129 |
| 2016/0215171 | A1* | 7/2016 | Marcellan | A61K 8/25 |

FOREIGN PATENT DOCUMENTS

| | | |
|---|---|---|
| GB | 1 485 694 A | 9/1977 |
| WO | 2006/076728 A2 | 7/2006 |
| WO | 2011/080080 A1 | 7/2011 |
| WO | 2011/102820 A1 | 8/2011 |

OTHER PUBLICATIONS

Calvin H. Li and G. P. Peterson, "Experimental investigation of temperature and volume fraction variations on the effective thermal conductivity of nanoparticle suspensions (nanofluids)," Journal of Applied Physics, 2006, vol. 99, 084314-1, 8 pages.
Xiang-Qi Wang and Arun S. Mujumdar, "Heat transfer characteristics of nanofluids: a review," International Journal of Thermal Sciences, 2007, vol. 46, pp. 1-19.
Sarit Kumar Das et al., "Heat Transfer in Nanofluids—A Review," Heat Transfer Engineering, 2006, vol. 27, No. 10, pp. 3-19.
J. Gansheimer and R. Holinski, "Molybdenum Disulfide in Oils and Greases Under Boundary Conditions," Transactions of the ASME, Journal of Lubrication Technology, Apr. 1973, vol. 95, pp. 242-248.
L. Cizaire et al., "Mechanisms of ultra-low friction by hollow inorganic fullerene-like MoS2 nanoparticles," Surface and Coatings Technology, 2002, vol. 160, No. 2, pp. 282-287.
L. Rapoport et al., "Tribological properties of WS2 nanoparticles under mixed lubrication," Wear, 2003, vol. 255, pp. 785-793.
J. Gansheimer and R. Holinski, "A Study of Solid Lubricants in Oils and Greases Under Boundary Conditions," Wear, 1972, vol. 19, pp. 439-449.
Mohsen Mosleh et al., "Modification of sheet metal forming fluids with dispersed nanoparticles for improved lubrication," Wear, 2009, vol. 267, pp. 1220-1225.
M. Mosleh and M. Ghaderi, "Deagglomeration of Transfer Film in Metal Contacts Using Nanolubricants," Tribology Transactions, 2012, vol. 55, No. 1, pp. 52-58.
A Ghadimi et al., "A review of nanofluid stability properties and characterization in stationary conditions," International Journal of Heat and Mass Transfer, 2011, vol. 54, pp. 4051-4068.
Y. Hwang et al., "Stability and thermal conductivity characteristics of nanofluids," Thermochimica Acta, 2007, vol. 455, No. 1, pp. 70-74.
PCT International Search Report and Written Opinion of the International Searching Authority dated Feb. 24, 2015 for International Application No. PCT/US2014/027832 (13 pages).
European Patent Office, Extended European Search Report for European Patent Application 14773167.3 dated Dec. 15, 2016 (8 pages).

* cited by examiner

FIG. 1: MoS₂ particles size distribution inside 10W30 engine oil against time

FIG. 2: Settlement of diamond nanoparticles dispersed in lubricating fluid after 24 hours. From left to right, the nanoparticle concentration was 0, 0.05%, 0.1%, and 0.2%.

FIG. 3. Comparison between non-gelled (left) and gelled nanofluids (middle and right) with diamond nanoparticles FIG. 4. Gelled nanofluids with $MoS_2$ nanoparticles FIG. 5: Nanofluid that has been heated to change from a gelled state into a fluid state FIG. 6: Gelling time at room temperature – time for formation of gel after the nanofluid reaches room temperature FIG. 7: Time for melting of gel at 60°C. Sodium oleate concentration forms a gel at 5°C and melts at room temperature

GELLING NANOFLUIDS FOR DISPERSION STABILITY

FIELD

The present application is generally directed to stabilizing lubricating fluids containing nanoparticles and, more particularly, stabilizing lubricating fluids containing nanoparticles with a gel whereby gelling of the fluid helps maintain the nanoparticles in the fluid.

BACKGROUND

Nanofluids are used in a variety of situations, such as in the form of nano-lubricants. Such nanofluids may be engineered by dispersing metallic or nonmetallic nanoparticles in traditional base fluids, such as engine oil, metalworking fluid, water, ethylene glycol, and the like.

The idea of nanofluids, i.e., nanoparticle-fluid dispersion, was introduced by Choi (S. U. S. Choi, "Enhancing thermal conductivity of fluids with nanoparticles," in Developments and Applications of Non-Newtonian Flows, D. A. Singer and H. P. Wang. Eds., ASME, New York, N.Y., USA, 1995) in the mid 1950's at the Argonne National Laboratory. However more than a century ago, Maxwell (J. C. Maxwell, "A treatise on electricity and magnetism," oxford: Oxford University Press, 1904) first theoretically proposed his technique to enhance the thermal conductivity of heat transfer fluids by adding highly conductive particles. Suspension of nanoparticles in various fluids, have been extensively investigated for applying in different types of applications in the past decades. Depending on the application, nanofluids are generally classified such as heat transfer nanofluids, anti-wear nanofluids, metalworking nanofluids, coating nanofluids, and chemical nanofluids.

Since the introduction of heat transfer nanofluids by Choi (S. U. S. Choi, "Enhancing thermal conductivity of fluids with nanoparticles," in Developments and Applications of Non-Newtonian Flows, D. A. Singer and H. P. Wang. Eds., ASME, New York, N.Y., USA, 1995), a number of studies have been conducted on thermal conductivity enhancement of nanofluids. It has been shown by different investigators that nanofluids have significantly improved heat transfer characteristics compared with the base fluids. Therefore, nanofluids have the potential to improve heat transfer and energy efficiency in thermal systems in applications such as microelectronics, power electronics, transportation, nuclear engineering, heat pipes, refrigeration, air-conditioning and heat pump systems (J. C. Maxwell, "A treatise on electricity and magnetism," oxford: Oxford University Press, 1904; C. H. Li et al., "Experimental investigation of temperature and volume fraction variations on the effective thermal conductivity of nanoparticle suspensions," J. Appl. Phys. 99 (2006) 084314; X. Q. Wang et al., "Heat transfer characteristics of nanofluids: A review," Int'l J. Therm. Sci., (2007) 46: 1; S. K. Das et al., "Heat transfer in nanofluids—a review," Heat Transfer Eng., 27 (2006) (10): 3).

Another application of nanofluids is in the field of lubrication. It has been demonstrated that dispersed nanoparticles in lubricants can be used to improve lubrication and result in lower friction and wear. The mechanisms by which nanoparticles improve lubrication are described in the literature as the formation of a transferred solid lubricant film from molybdenum disulfide ($MoS_2$) nanoparticles under the contact pressure (J. Gansheimer et al., "Molybdenum disulfide in oils and greases under boundary conditions," ASME, Journal of Lubrication Technology 95 (1973) 242-248), rolling of spherical nanoparticles in the contact zone (L. Cizaire et al., "Mechanisms of ultra-low friction by hollow inorganic fullerene-like MoS2 nanoparticles," Surface and Coatings Technology 160 (2002) 282-287), reducing asperity contact by filling the valley of contacting surface (L. Rapoport et al., "Tribological properties of WS2 nanoparticles under mixed lubrication," Wear 255 (2003) 785-793), and shearing nanoparticles at the interface without the formation of an adhered film (J. Gansheimer et al., "A study of solid lubricant in oils and greases under boundary conditions," Wear 19 (1972) 430-449).

Nanoparticles can be dispersed in metalworking fluids for operations such as drilling, cutting, milling, and grinding. The resultant nanofluids can be used to prevent welding between the workpiece which results in better surface finish of the workpiece and a longer tool life (M. Mosleh et al., "Modification of sheet metal forming fluids with dispersed nanoparticles for improved lubrication," Wear, Wear 267 (2009) 1220-1225; M. Mosleh et al., "Deaglomeration of transfer film in metal contacts using nanolubricant," Tribology Transaction, 55 (2012) 52-58).

The use of nanofluids in a wide variety of applications is promising, but poor suspension stability of nanoparticles in the solution hinders the further development of nanofluids applications. For example, as the nanofluid is stored, the nanoparticles settle out, thereby losing the performance improvements desired by inclusion of nanoparticles. It is believed that strong van der Waals interactions between nanoparticles cause aggregation which leads to quick particle settlement as the particles become larger. Once the nanoparticles settle, the nanofluid loses its property enhancement.

Figure 1:
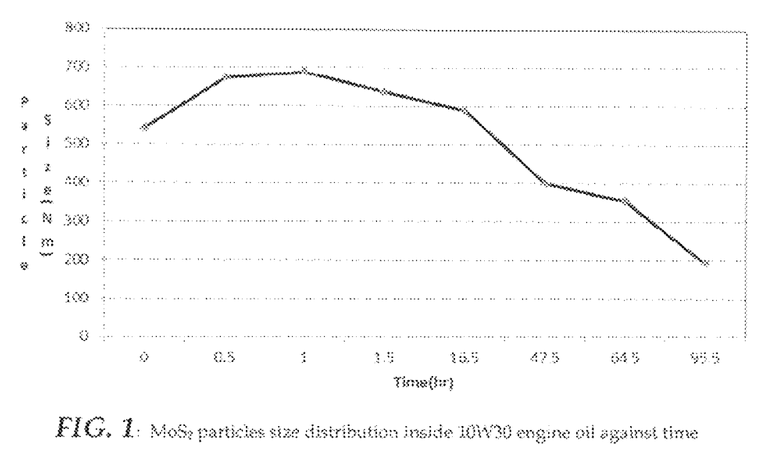
FIG. 1 is a graph representing nanoparticle size distribution in engine oil against time representing agglomeration of the nanoparticles when not in a gelled nanofluid.

FIG. 1 shows the aggregation behavior of Molybdenum disulfide ($MoS_2$) nanoparticles in 10w30 engine oil. Aggregation causes the nanoparticles to form particle clusters after the first few hours. Then, gravity causes the clusters to settle quickly. Therefore, after the first few hours, the average size of remaining particles decreases.

Figure 2:
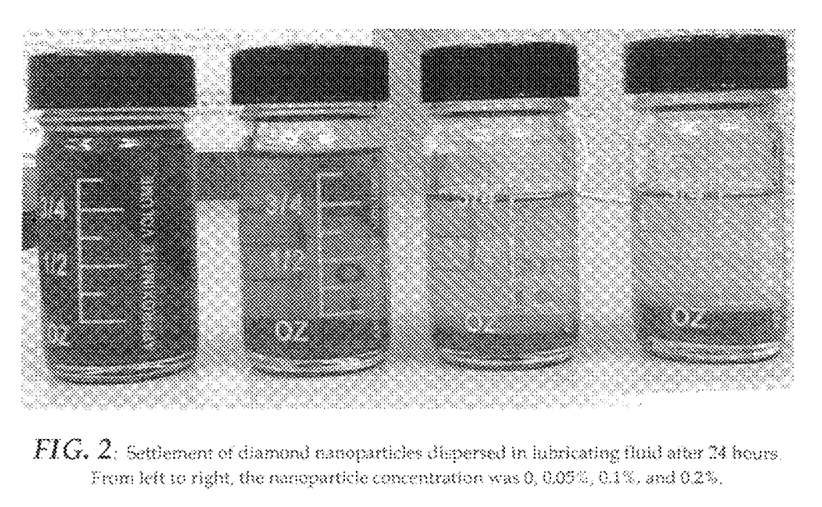
FIG. 2 is a representation of various concentrations of nanoparticles as the nanoparticles settle out of the fluid when in a standard, non-gelling nanofluid.

FIG. 2 shows a representation of settlement of diamond nanoparticles of various concentrations in Boelube®, an advanced cutting fluid made by The Orelube Corporation, after 24 hours of being stationary.

To resolve the settlement problem and to attempt to obtain homogeneous stable nanofluids, physical and chemical treatments such as surfactants, applying strong forces on the cluster of the suspended particles, and dispersing agents have been utilized (A. Ghadimi et al., "A review of nanofluid stability properties and characterization in stationary conditions," International Journal of Heat and Mass Transfer 54 (2011) 4051-4068; Y. Hwang et al., "Stability and thermal conductivity characteristics of nanofluids," Thermochim, Acta 455 (1-2) (2007) 70-74).

Three different methods are used in the literature in order to manage stability of suspension against settlement of nanoparticles. A first method has attempted to use surfactants. This method has been utilized to keep the suspension stable through modification of hydrophobic surfaces of nanoparticles into the hydrophilic state. A repulsion force between suspended particles is caused by the zeta potential which will rise due to the surface charge of the particles suspended in the base fluid.

A second method has attempted to use pH control. The electrokinetic properties of an aqueous solution can be used to influence the nanoparticle stability. Stabilization of a dispersed suspension can be obtained by a high surface charge density that causes strong repulsive forces. It has been discovered that simple acid treatment brings a better carbon nanotube suspension in water. A hydrophobic-to-hydrophilic conversion of the surface nature, due to the generation of hydroxyl group, is involved in this process. As the pH of the nanofluid increases beyond the isoelectric point, the surface charge increases by using the surfactant. In this regard, the nanoparticles may be more stable in the fluid.

A third method utilizes ultrasonic vibration. Ultrasonic disruptors, ultrasonic baths and homogenizers are useful means for breaking down the agglomerations in nanofluids. These devices are applied by many researchers to obtain homogeneous suspensions with fewer aggregation particles. With fewer agglomerations, it is believed that the nanoparticles may stay in solution longer before settling to the bottom.

Therefore, it is desirable to produce a nanofluid which further maintains the nanoparticles suspended in the fluid.

SUMMARY

The present application is directed to compositions and methods for manufacture by which nanofluid gels are produced so that the settlement of nanoparticles in the base fluid is improved due to the inhibition of particle movement in the gel. The nanofluid gel is produced by using a gelling surfactant which is either coated on the nanoparticles prior to dispersion in the base fluid or directly introduced in the base fluid.

In one form, two types of nanofluid gels may be produced. In the first type, the concentration of the gelling surfactant is effective so that the gelling of the nanofluid will only occur at low temperatures, such as, for example, below 10° C. The gelled nanofluid will return to the fluid state once it is brought to a room temperature environment. This type of nanofluid gel can be transported and shelved at temperatures below 10° C. to prevent particle settlement. When the gel is exposed to room temperature environment, it turns into the liquid state and is ready for use. This property allows for the pumping of the nanofluids at room temperature as required in many industrial applications such as cutting fluids.

In the second type of the nanofluid gels, the concentration of the gelling surfactant is effective so that the gelling of the nanofluid will occur at room temperature. The resultant nanofluid gel can be returned to the liquid state by increasing its temperature above room temperature. In this regard, the temperature increase for turning the nanofluid gel into the liquid state depends on the concentration of the gelling surfactant and other processing parameters.

In one form, a nanofluid is provided including a base fluid, a nanoparticle component and a gelling agent. The gelling agent is provided in an amount effective to cause the nanofluid to change from a liquid state to a gelled state at temperatures below at least about 10° C., the gelled state helping to maintain the nanoparticle component suspended throughout the base fluid.

According to one form, a method of preparing a gelling nanofluid is provided. The method includes the steps of: coating a first nanoparticle component with a gelling agent to form coated nanoparticles; and combining the coated nanoparticles with a base fluid to form the gelling nanofluid, the gelling agent provided in an amount effective to cause the nanofluid to change from a liquid state to a gelled state at temperatures below at least about 10° C., the gelled state helping to maintain the nanoparticle component suspended throughout the base fluid.

In accordance with one form, a method of preparing a gelling nanofluid is provided. The method includes the steps of: combining a base fluid with a first nanoparticle component and a gelling agent to form a gelling nanofluid; and cooling the gelling nanofluid to a temperature of less than about 20° C., the gelling agent provided in an amount effective to cause the nanofluid to change from a liquid state to a gelled state at temperatures below at least about 10° C., the gelled state helping to maintain the nanoparticle component suspended throughout the base fluid.

In one form, the nanoparticle component is selected from the group consisting of diamond nanoparticles, $MoS_2$ nanoparticles, tungsten disulfide ($WS_2$), and combinations thereof.

According to one form, the base fluid is a polar fluid.

In accordance with one form, the base fluid is selected from the group consisting of water, long chain alcohol-base machining lubricant, oil-in-water emulsions, and mixtures thereof.

In one form, the base fluid is long chain alcohol-base machining lubricant, such as Boelube®, an advanced cutting fluid made by The Orelube Corporation. Other machining lubricants may also be used.

According to one form, the gelling agent is provided in a range of about 0.2 to about 2.0 wt. %.

In accordance with one form, the gelling agent is selected from the group consisting of sodium oleate, alginic acid, sodium linoleate, and mixtures thereof.

In one form, the gelling agent is sodium oleate.

According to one form, the gelling agent is provided in an amount effective to cause the nanofluid to change from a liquid state to a gelled state at temperatures below at least about 20° C.

DETAILED DESCRIPTION

In one approach it may be desirable to provide a long term substantially homogeneous, stable nanofluid using specified amounts of one or more gelling agents. In this regard, the nanofluid may include a fluid base, one or more nanoparticle components and a gelling agent. The combinations of these features may be used to provide a nanofluid that gels at a desired temperature, such as at a desired storage temperature. In this regard, the combination may help the nanoparticles remain in suspension when in storage such that the nanoparticles are still substantially suspended when used in a fluid state.

Various forms of base fluids may be used to provide the desired properties and functionalities. In one form, the base fluid is a polar fluid such that when combined with the gelling agent, the combination will gel at a desired temperature. In one form, a suitable base fluid is Boelube®, a lubricant fluid manufactured by The Orelube Corporation. Such a base fluid generally is a long chain alcohol-base machining lubricant. Boelube® is a metalworking fluid that does not leave any residues on the workpiece after the machining process such that cleanup is easy.

Other suitable polar base fluids include oil-in-water machining fluid emulsions. Other machining lubricants may also be used.

Various forms of nanoparticles may be used in the gelling nanofluid composition. For example, such nanoparticles include, but are not limited to, $MoS_2$, diamond, and $WS_2$. Other nanoparticles may include aluminum oxide, silicon oxide, boron carbide, silicon carbide, and zirconium oxide.

The size of the nanoparticles may also be modified to achieve desired properties and/or functionality. For example, in one form, the nanoparticles may have an average particle size in the range of about 5 nm to about 300 nm. According to one form, the nanoparticles may have an average size in the range of about 5 to about 100 nm.

The concentration of the nanoparticles in the fluid may also be varied as desired. For example, the concentration of the nanoparticles may be in the range of about 0.1 to about 5 wt. %. In one form, the concentration of the nanoparticles may be in the range of about 1 to about 4 wt. %.

In one form, $MoS_2$ particles may be included having an average particle size of about 90 nm and a concentration of about 0.1 wt. %. In another form, diamond nanoparticles may be included having an average particle size of about 3-5 nm and a concentration of about 0.2 wt. %.

It should be understood that the composition may include a plurality of different types of nanoparticles used in combination. For example, the composition may include both diamond nanoparticles and $MoS_2$ nanoparticles. Other nanoparticles may also be used in combination with one another.

The gelling agent may take a variety of forms to provide the desired properties and/or functionality. In one form the gelling agent can be a gelling surfactant. There are many surface active agents or surfactants that can be used as gelling surfactants. Such materials include, but are not limited to, castor oil derivatives, polyamides, organoclays, fumed silicas, and oil gelling polymers. These surfactants can be employed for different applications depending on activation temperatures, breakdown due to other components of the formulations, and handling difficulties. The surfactant may come in solid powder which can be dissolved at room or higher than room temperature in the base fluid.

According to one form, the gelling agent is sodium oleate. Sodium oleate, a metal salt of oleic acid, is a compound with a double bond in the middle of chain as exhibited in the formula $CH_3-(CH_2)_7-CH=CH-(CH_2)_7-COONa$. Sodium oleate is a molecule with a hydrophilic headgroup or polar head, and a hydrophobic tail. When dispersed in a liquid at concentration above their critical micelle concentration (CMC), it forms micelles. Sodium oleate micelles in aqueous solution form an aggregate with hydrophilic head regions in contact with surrounding solvent sequestering the hydrophobic single tail regions in the micelle center. The micelles grow to form long fibrils. These fibrils overlap or entangle to form the gel network. In this form, the sodium oleate may be suitable as a gelling agent in one or more nanofluids. Sodium linoleate is another exemplary form of a gelling agent.

The concentration of the gelling agent may also be varied to achieve different properties and/or functionality. For example, the concentration of the gelling agent may be varied to provide different gelling temperatures. In one form, for some gelling agents, by increasing the concentration of the gelling agent, the temperature at which the fluid gels will increase. For example, by including a higher concentration of a particular gelling agent, the fluid may gel around room temperature (about 20° C.) while a lower concentration of the gelling agent may cause the fluid to gel at a lower temperature, such as about 10° C.

The concentration of the gelling agent may also depend on the base fluid. Further, the ratio of the gelling agent to the base fluid may also impact the gel formation. For example, a ratio of 0.1 to about 5 of the gelling agent to the base fluid may be suitable to provide a gelling nanofluid at about 25° C.

In one form, the concentration of the gelling agent may be in the range of about 0.1 to about 0.5. In another form, the concentration of the gelling agent may be in the range of about 0.05 to about 0.2 wt. %.

The nanofluid gel may be produced in a number of different manners. For example, in one form, the gelling nanofluid may be prepared by using a gelling agent which is coated on the nanoparticles prior to dispersion in the base fluid. In this regard, the nanoparticles may be first dispersed in the methyl alcohol or other suitable solvent. Next, the gelling agent is added at the desired weight percentage. The solution can then be sonicated to separate particle agglomerates and help with dispersion. In one form, if necessary, the solution can then be heated up to about 90° C. so the alcohol is gradually evaporated. The base fluid, such as Boelube®, is then added with the desired weight percentage. The dispersion is again subjected to sonication for improved quality of dispersion.

In another form, the gelling agent may be directly introduced in the base fluid. In this method, the gelling agent is added to the base fluid. In one form, if needed, the temperature is raised by 50° C. so that the gelling agent, which can be in powder form, can be completely dissolved. Then nanoparticles may then be added and the solution subjected to sonication for improved dispersion quality.

Figure 3:
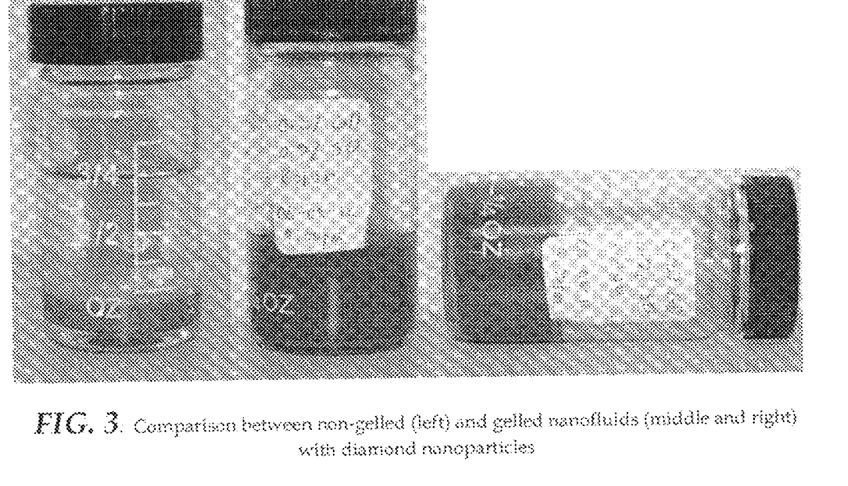
FIG. 3 is a representation comparing a non-gelling nanofluid with a gelling nanofluid with diamond nanoparticles.

FIG. 3 shows a non-gelled nano-Boelube® and gelled nano-Boelube® containing diamond nanoparticles. In the non-gelled nano-Boelube®, the diamond nanoparticles have completely settled after 24 hours. On the other hand, in the gelled nano-Boelube® the cross-linked structure of the gel has substantially prevented any particle settlement. As can be seen the gelled, homogeneous dispersion is sustained and stabilized.

Figure 4:
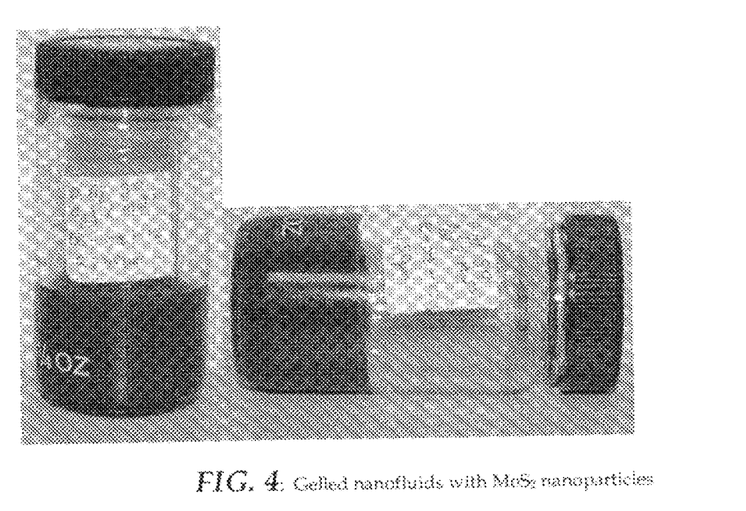
FIG. 4 is a representation showing gelling nanofluids having $MoS_2$ nanoparticles.

FIG. 4 shows the gelled nanofluid using $MoS_2$ nanoparticles with an average particle size of 90 nm in Boelube®. The gelling process was similar to that used in preparation of diamond-based nanofluids, except that the nanoparticle concentration was 0.1% by weight.

Figure 5:
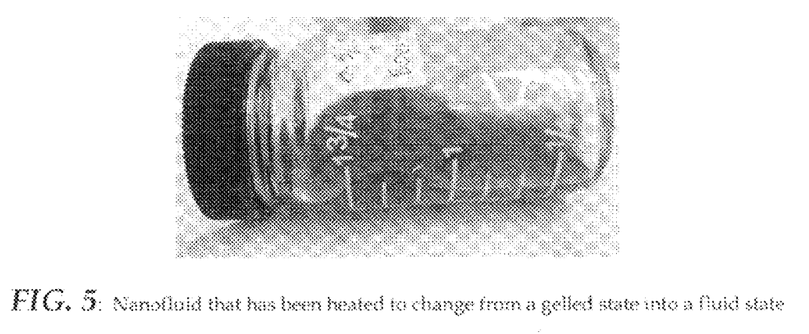
FIG. 5 is a representation showing a gelling nanofluid that has been heated to turn from a gelled state to a fluid state.

FIG. 5 shows a sample of the base fluid, i.e., Boelube®, which had been gelled at room temperature and then heated up beyond room temperature by 25° C. The gel was turned into the liquid state.

Figure 6:
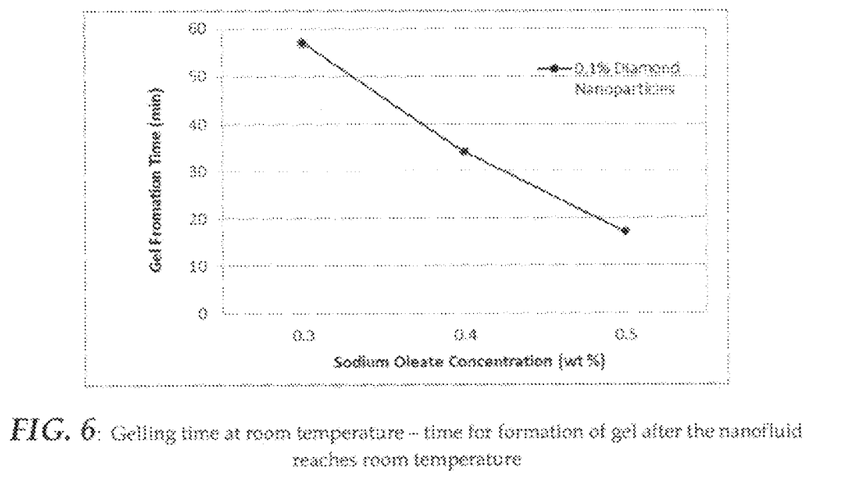
FIG. 6 is a graph representing the gelling time for various concentrations of gelling agents.

Referring now to FIG. 6, gel formation time is plotted against sodium oleate concentration for nanofluids containing 0.1% by weight diamond nanoparticles. The overall composition was prepared by coating nanoparticles with sodium oleate, as described above. The gel formation time was measured after the nanofluid was prepared and its temperature became the room temperature.

Figure 7:
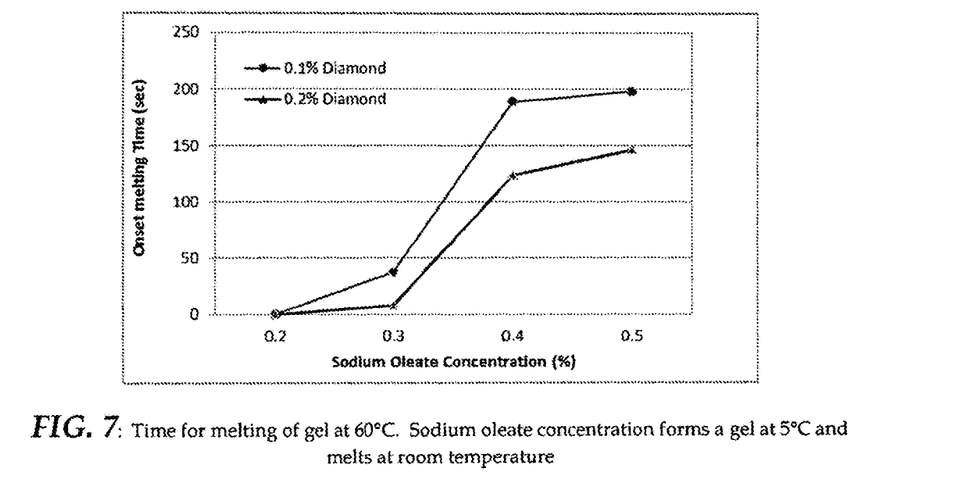
FIG. 7 is a graph representing the melting time for a gelled nanofluid to change to a fluid state for various concentrations of gelling agents and nanoparticles.

FIG. 7 illustrates the time it takes for a nanofluid gel to become liquid when subjected to an environmental temperature of about 60° C. A number sealed bottles of nanofluid gel containing 10 cc of gel with different particle concentrations and sodium oleate concentrations were dropped in a hot water bath with a temperature of 60° C. The time for the first sign of melting of the gel to appear was measured and plotted against time. The results are shown in FIG. 7.

It is believed that when the nanofluid is in the form of a gel and maintained below the gelling temperature, the material can be stored for an infinite shelf life with a stable solution without particle settlement. Further, large volumes of gelling fluid can be brought above the gelling temperature for use and any unused portion can be re-cooled to a gel state for further storage.

A number of exemplary compositions were prepared and tested to verify performance and gelling capabilities.

EXAMPLES

Example 1

In Example 1, one form of a gelling nanofluid was prepared wherein the gelling agent is sodium oleate. The gelling process started by coating the diamond nanoparticles with sodium oleate. Initially, 0.5 wt. % of sodium oleate was dissolved in methyl alcohol. Then, 0.2 wt. % of diamond nanoparticles with an average particle size of 3-5 nm were added to the methyl alcohol solution. The solution was sonicated for 15 minutes. The solution was then heated up to about 90° C. until all the alcohol evaporated. Therefore, the diamond particles were covered by the sodium oleate coating.

Next, the base fluid, which was Boelube®, was added to the composition and sonicated. The compound became a gel after one hour of remaining stationary in the container. It is hypothesized that the role of sodium oleate is to form a three-dimensional cross-linked network in the nanofluid which is the requirement for a gel.

Example 2

Example 2 was prepared to analyze the gelling temperature of the nanofluid. In one form, the concentration of sodium oleate was in the range of 0.1-0.5% by weight and the gelling of the nanofluid occurred in temperatures below 10° C. The gelled nanofluid returned to the fluid state once it is brought to the room temperature environment.

Example 3

Example 3 was prepared to compare different concentrations of the gelling agent on the gelling temperature. For example, the concentration of the gelling agent was in the range of about 0.5-5% by weight and the gelling of the nanofluid occurred at room temperature. The resulting nanofluid gel returns to the fluid state by increasing its temperature above the room temperature, such as about 20-100° C.

The foregoing descriptions are not intended to represent the only forms of the compositions and methods in regard to the details of the overall composition and preparation. The percentages provided herein are by weight unless stated otherwise. Changes in form and in proportion of parts, as well as the substitution of equivalents, are contemplated as circumstances may suggest or render expedient.

What is claimed is:

1. A nanofluid comprising:
   a base fluid;
   a nanoparticle component; and
   a gelling agent provided in an amount effective to cause the nanofluid to change from a liquid state to a gelled state at temperatures below at least about 10° C., the gelled state helping to maintain the nanoparticle component suspended throughout the base fluid, wherein the gelling agent is selected from the group consisting of sodium oleate, alginic acid, sodium linoleate, and mixtures thereof.

2. A nanofluid comprising:
   a base fluid;
   a nanoparticle component; and
   a gelling agent provided in an amount effective to cause the nanofluid to change from a liquid state to a gelled state at temperatures below at least about 10° C., the gelled state helping to maintain the nanoparticle component suspended throughout the base fluid, wherein the nanoparticle component is selected from the group consisting of diamond nanoparticles, $MoS_2$ nanoparticles, $WS_2$, and combinations thereof.

3. The nanofluid of claim 1 wherein the base fluid is a polar fluid.

4. The nanofluid of claim 3 wherein the base fluid is selected from the group consisting of water, long chain alcohol-base machining lubricant, oil-in-water emulsions, and mixtures thereof.

5. A nanofluid comprising:
   a base fluid;
   a nanoparticle component; and
   a gelling agent provided in an amount effective to cause the nanofluid to change from a liquid state to a gelled state at temperatures below at least about 10° C., the gelled state helping to maintain the nanoparticle component suspended throughout the base fluid, wherein the base fluid is a long chain alcohol-based machining lubricant.

6. The nanofluid of claim 1 wherein the gelling agent is provided in a range of about 0.2 to about 2.0 wt. %.

7. The nanofluid of claim 1 wherein the gelling agent is sodium oleate.

8. The nanofluid of claim 1 wherein the gelling agent is provided in an amount effective to cause the nanofluid to change from a liquid state to a gelled state at temperatures below at least about 20° C.

9. A method of preparing a gelling nanofluid, the method comprising the steps of:
   coating a first nanoparticle component with a gelling agent to form coated nanoparticles; and
   combining the coated nanoparticles with a base fluid to form the gelling nanofluid, the gelling agent provided in an amount effective to cause the nanofluid to change from a liquid state to a gelled state at temperatures below at least about 10° C., the gelled state helping to maintain the nanoparticle component suspended throughout the base fluid.

10. The method of claim 9 wherein the base fluid is a polar fluid.

11. The method of claim 10 wherein the base fluid is selected from the group consisting of water, long chain alcohol-base machining lubricant, oil-in-water emulsions, and mixtures thereof.

12. The method of claim 9 wherein the gelling agent is provided in a range of about 0.2 to about 2.0 wt. %.

13. The method of claim 9 wherein the gelling agent is selected from the group consisting of sodium oleate, alginic acid, sodium linoleate, and mixtures thereof.

14. The method of claim 13 wherein the gelling agent is sodium oleate.

15. The method of claim 9 wherein the gelling agent is provided in an amount effective to cause the nanofluid to change from a liquid state to a gelled state at temperatures below at least about 20° C.

16. A method of preparing a gelling nanofluid, the method comprising the steps of:

combining a base fluid with a first nanoparticle component and a gelling agent to form a gelling nanofluid; and cooling the gelling nanofluid to a temperature of less than about 20° C., the gelling agent provided in an amount effective to cause the nanofluid to change from a liquid state to a gelled state at temperatures below at least about 10° C., the gelled state helping to maintain the nanoparticle component suspended throughout the base fluid.

17. The method of claim 16 wherein the base fluid is a polar fluid.

18. The method of claim 17 wherein the base fluid is selected from the group consisting of water, long chain alcohol-base machining lubricant, oil-in-water emulsions, and mixtures thereof.

19. The method of claim 16 wherein the gelling agent is provided in a range of about 0.2 to about 2.0 wt. %.

20. The method of claim 16 wherein the gelling agent is selected from the group consisting of sodium oleate, alginic acid, sodium linoleate, and mixtures thereof.

21. The method of claim 16 wherein the gelling agent is provided in an amount effective to cause the nanofluid to change from a liquid state to a gelled state at temperatures below at least about 20° C.

22. The nanofluid of claim 1 wherein the base fluid is a non-aqueous fluid having a moisture content less than about 20%.

* * * * *

UNITED STATES PATENT AND TRADEMARK OFFICE
CERTIFICATE OF CORRECTION

PATENT NO. : 9,840,679 B2  
APPLICATION NO. : 14/774619  
DATED : December 12, 2017  
INVENTOR(S) : Mohsen Mosleh and Mohammad Ghaderi-Yeganeh Page 1 of 1

It is certified that error appears in the above-identified patent and that said Letters Patent is hereby corrected as shown below:

In the Specification

Column 1, Line 3, after the Title, insert the section:
-- CROSS-REFERENCE TO RELATED APPLICATIONS
This application is a U.S. national phase application filed under 35 U.S.C. § 371 of International Application PCT/US2014/027832, filed March 14, 2014, designating the United States, which claims benefit of United States Provisional Application Number 61,784,636, filed March 14, 2013, which are hereby incorporated herein by reference in their entirety. --

Signed and Sealed this
Seventeenth Day of April, 2018

Andrei Iancu
*Director of the United States Patent and Trademark Office*